United States Patent
Huang (10) Patent No.: US 9,996,104 B2
(45) Date of Patent: Jun. 12, 2018

(54) FREQUENCY ADJUSTMENT METHOD, SYSTEM-ON-CHIP, AND TERMINAL

(71) Applicant: Huawei Technologies Co., Ltd., Shenzhen (CN)

(72) Inventor: Tao Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/475,298

(22) Filed: Mar. 31, 2017

(65) Prior Publication Data

US 2017/0285682 A1     Oct. 5, 2017

(30) Foreign Application Priority Data

Mar. 31, 2016  (CN) .......................... 2016 1 0200273

(51) Int. Cl.
  *G06F 15/78*  (2006.01)
  *G06F 1/08*   (2006.01)

(52) U.S. Cl.
  CPC .............. *G06F 1/08* (2013.01); *G06F 15/78* (2013.01); *G06F 15/781* (2013.01)

(58) Field of Classification Search
  None
  See application file for complete search history.

(56) References Cited

U.S. PATENT DOCUMENTS

| 8,930,597 B1 * | 1/2015 | Fung ................... G06F 13/1689 370/537 |
| 2002/0149967 A1 * | 10/2002 | Borkenhagen ....... G11C 7/1078 365/189.05 |

(Continued)

FOREIGN PATENT DOCUMENTS

CN         1762028 A      4/2006

OTHER PUBLICATIONS

David, H., et al., "Memory Power Management via Dynamic Voltage / Frequency Scaling," https://people.inf.ethz.ch/omutlu/pub/fallin_icac11_talk.pdf, Jun. 26, 2011, 43 pages.

(Continued)

*Primary Examiner* — Mano Padmanabhan
*Assistant Examiner* — Jean C Edouard
(74) *Attorney, Agent, or Firm* — Conley Rose, P.C.

(57) ABSTRACT

A frequency adjustment method, a System-On-a-Chip, and a terminal are provided. In the embodiments of this application, when an access bandwidth requirement on a DDR memory changes, a first frequency adjustment request for a DDR interface is generated using a CPU, and a working frequency of the DDR interface is adjusted. Because during adjustment of the working frequency of the DDR interface, the working frequency of the DDR interface is gradually adjusted according to a predetermined adjustment amount by which a frequency adjustment coefficient of a spread spectrum clocking generator is adjusted each time and a predetermined interval between two adjacent adjustments, it is ensured that a DLL in the DDR interface and a phase-locked loop in the spread spectrum clocking generator are in locking-in states, so that the DDR memory can still be accessed during frequency adjustment of the DDR interface and system performance is ensured.

15 Claims, 3 Drawing Sheets

(56) References Cited

U.S. PATENT DOCUMENTS

| | | | | |
|---|---|---|---|---|
| 2003/0070052 A1* | 4/2003 | Lai | ...................... | G06F 13/1694 711/167 |
| 2003/0071668 A1* | 4/2003 | Starr | .................... | H03L 7/0891 327/157 |
| 2004/0090821 A1* | 5/2004 | Johnson | ............... | G11C 7/1078 365/154 |
| 2004/0239397 A1 | 12/2004 | Mudge et al. | | |
| 2005/0047192 A1* | 3/2005 | Matsui | ................ | G06F 13/1689 365/145 |
| 2006/0233036 A1 | 10/2006 | Blodgett et al. | | |
| 2007/0234100 A1* | 10/2007 | Baker | ................... | G06F 1/3203 713/600 |
| 2008/0112526 A1* | 5/2008 | Yi | ....................... | H03D 13/004 375/376 |
| 2008/0162980 A1* | 7/2008 | Dahan | ................. | G06F 13/1694 713/601 |
| 2009/0150707 A1* | 6/2009 | Drucker | ............. | G06F 13/4243 713/401 |
| 2009/0204831 A1* | 8/2009 | Cousson | ............... | G06F 1/3203 713/322 |
| 2010/0005218 A1* | 1/2010 | Gower | ................ | G06F 13/4234 711/5 |
| 2010/0052751 A1* | 3/2010 | Abe | ..................... | G11C 7/1051 327/158 |
| 2010/0077139 A1* | 3/2010 | Gregorius | ........... | G06F 13/1663 711/105 |
| 2012/0194248 A1* | 8/2012 | Magee | ..................... | G11C 7/04 327/262 |
| 2013/0083611 A1* | 4/2013 | Ware | .................... | G11C 11/4072 365/191 |
| 2014/0015573 A1* | 1/2014 | Ross | .................... | H03L 7/0812 327/142 |
| 2014/0032812 A1* | 1/2014 | Ong | ....................... | G11C 7/222 711/102 |
| 2015/0033062 A1 | 1/2015 | Tsao et al. | | |
| 2015/0106649 A1* | 4/2015 | Kannan | ............... | G06F 11/3034 713/501 |

OTHER PUBLICATIONS

Foreign Communication From A Counterpart Application, European Application No. 17163763.0, Extended European Search Report dated Aug. 4, 2017, 7 pages.

Foreign Communication From A Counterpart Application, Chinese Application No. 201610200273.X, Chinese Office Action dated Dec. 13, 2017, 13 pages.

* cited by examiner

FREQUENCY ADJUSTMENT METHOD, SYSTEM-ON-CHIP, AND TERMINAL

CROSS-REFERENCE TO RELATED APPLICATION

This application claims priority to Chinese Patent Application No. 201610200273.X, filed on Mar. 31, 2016, which is hereby incorporated by reference in its entirety.

TECHNICAL FIELD

This application relates to the field of DDR frequency processing technologies, and in particular, to a frequency adjustment method, a System-On-a-Chip, and a terminal.

BACKGROUND

Currently, a double data rate synchronous dynamic random access memory (DDR SDRAM) is commonly used in a mobile terminal as a memory of the mobile terminal. Generally, the DDR SDRAM is referred to as DDR for short; a clock rate of the DDR is variable, and changes with a working frequency of a central processing unit.

Figure 1:
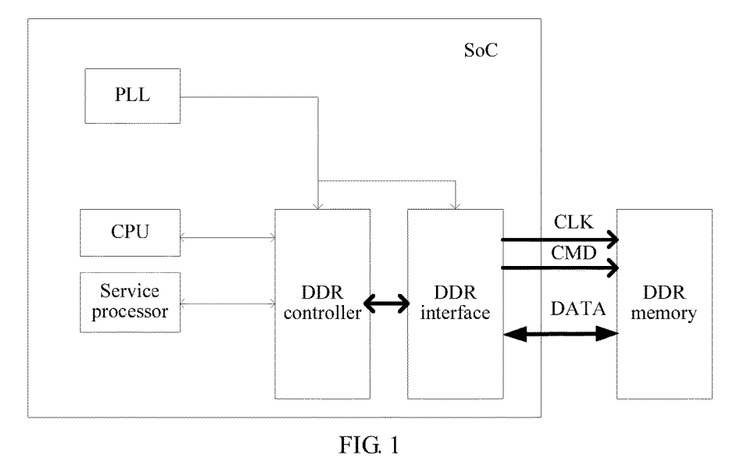
FIG. 1 is a schematic diagram of a combination of an SoC and a DDR memory.

FIG. 1 is a schematic structural diagram of a combination of a DDR memory and a System-On-a-Chip (SoC) that includes a DDR interface. The SoC system includes a central processing unit (CPU), a service processor, a phase-locked loop (PLL), a DDR controller, and the DDR interface. The DDR controller, the DDR interface (also referred to as a DDR PHY), and the DDR memory form a DDR system. A data channel (DATA channel shown in FIG. 1), a clock channel (CLK channel shown in FIG. 1), a command channel (CMD channel shown in FIG. 1), and the like exist between the DDR interface and the DDR memory. The CPU and at least one service processor are both connected to the DDR controller. The CPU is mainly responsible for running an operating system and scheduling service software, and instructions and data for processing need to be obtained from the DDR memory. There may be at least one service processor; for example, a service processor 1 may be a video encoder or decoder, which needs to read from and write to the storage of the DDR memory, and generally includes some internal cache units to cache received data and data to be sent; for another example, a service processor 2 may be a network unit, an audio unit, or the like, which needs to read from and write to the storage of the DDR memory, and also generally includes some internal cache units to cache received data and data to be sent. The DDR controller is used to accept DDR read/write requests of the CPU or the service processor, take the responsibility of scheduling priorities of the read/write requests, and return, to the CPU or the service processor, data that is obtained from the DDR memory in response to the DDR request. The DDR interface is used to send read/write commands of the DDR controller to a DDR storage unit according to a physical time sequence and take the responsibility of returning data of the DDR memory to the DDR controller according to a time sequence.

Generally, caches with particular capacities are set in the CPU and the service processor, and are configured to store read/written data of the DDR interface. A greater demand for reading/writing data from the DDR memory and a greater read/write delay indicate greater capacities of the caches in the CPU and the service processor. If the DDR read/write delay increases, performance of the CPU and the service processor become worse. Therefore, to reduce system power consumption and improve system performance, generally, a working frequency of the DDR interface is dynamically adjusted according to a bandwidth requirement of the system, and this is referred to as DDR dynamic frequency adjustment (DFA). For example, when the CPU in the SoC system has a large bandwidth for accessing the DDR memory, the DDR interface is set to a relatively high clock rate; and when the CPU in the SoC system has a small bandwidth for accessing the DDR memory, the DDR interface is set to a relatively low clock rate.

Figure 2:
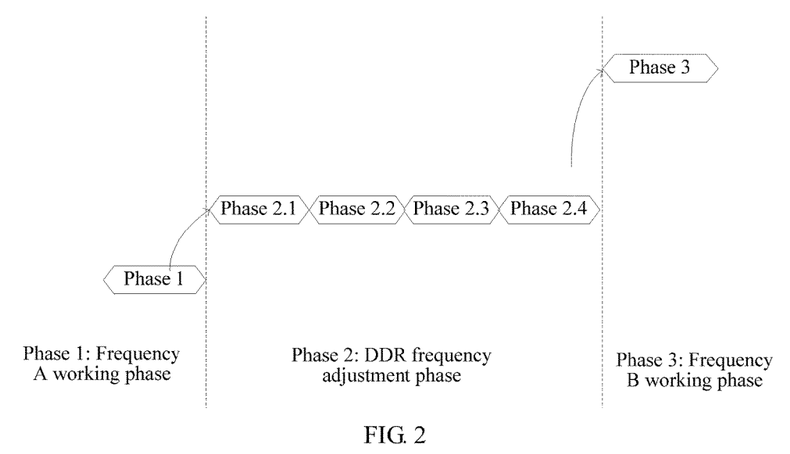
FIG. 2 is a schematic diagram of adjusting a working frequency of a DDR interface.

As shown in FIG. 2, the adjustment of the working frequency of the DDR interface generally includes the following phases.

Phase 1: The DDR interface works normally at a frequency A.

After a requirement that the SoC system needs to switch the frequency of the DDR interface is received, a frequency adjustment process of the DDR interface begins.

Phase 2: DDR frequency adjustment phase. In this phase, the DDR memory cannot be accessed. Generally, the process includes the following steps.

Phase 2.1. The DDR controller suspends, using back pressure, data read/write of the service processor, and empties data cached in the DDR controller.

Phase 2.2. The DDR memory starts self-refresh.

Phase 2.3. The DDR memory switches the clock rate from the frequency A to a frequency B.

Phase 2.4. Wait until working clocks of the DDR interface and the DDR memory become stable again at the frequency B.

Phase 3: The DDR memory exits the self-refresh and back pressure, and the DDR interface resumes working at the frequency B.

In the foregoing solution, during the frequency adjustment of the DDR interface, that is, during the phase 2, an operation of accessing the DDR memory needs to be suspended, and read/write access of the service processor and the CPU is suspended. In this case, the capacity of the cache in the service processor needs to be increased to ensure continuity of a service. Using a DDR3 64-Bit DDR interface as an example, when the system needs to reduce power consumption from 1600 megabits per second (Mbps) to 1200 Mbps, if the foregoing method is used, access suspension of the entire DDR memory lasts at least 50 microseconds (µs) (actually, DDR parameters of systems are different, 50 µs is a conservative estimation, and in many systems, the time is longer than 50 µs), and during this period, it is necessary to consider increasing the capacities of caches in all online service processors (such network, video input, and display), so as to store data that needs to be received or sent in real time on the DDR interface. Assuming that efficiency of the DDR is 60%, during access suspension of the DDR, a total amount of data to be cached in service modules is: 1200*32*50*0.6/1000000~=3 megabits (Mbits), and this causes a relatively high requirement on the cache in the service processors. In addition, because the CPU cannot access the DDR memory during the frequency adjustment of the DDR interface, processing performance of the CPU is affected.

SUMMARY

This application provides a frequency adjustment method, a SoC, and a terminal, so as to avoid a problem that a DDR memory cannot be accessed during a working frequency switching phase of a DDR interface, thereby ensuring system performance.

According to a first aspect, this application provides an SoC, where the SoC may be installed in a terminal, and the SoC includes a CPU, a service processor, a DDR controller, a DDR interface, and a spread spectrum clocking generator, where the DDR controller is separately connected to the CPU, the service processor, the spread spectrum clocking generator, and the DDR interface; the service processor is configured to access, using the DDR controller and the DDR interface, a DDR memory coupled to the SoC; and the spread spectrum clocking generator is configured to receive an input clock rate and output a clock rate to the DDR interface, where the input clock rate received by the spread spectrum clocking generator is an input frequency of the spread spectrum clocking generator, and the clock rate output by the spread spectrum clocking generator to the DDR interface is an output frequency of the spread spectrum clocking generator; and in this embodiment of the present disclosure, the input frequency of the spread spectrum clocking generator may be set to a fixed value, and may be received from outside of the SoC, or a crystal oscillator may be disposed in the SoC to generate a clock rate, and the clock rate is output to the spread spectrum clocking generator as the input frequency of the spread spectrum clocking generator.

The SoC further includes a frequency adjustment module, where the frequency adjustment module is separately connected to the spread spectrum clocking generator and the CPU. The DDR interface in the SoC is connected to the DDR memory.

When the SoC system is working, scenario switching usually occurs, and in this case, an access bandwidth requirement of the SoC system on the DDR memory changes. An access bandwidth requirement of the service processor on the DDR memory changes. The service processor may be an audio or a video encoder or decoder, a network unit, or the like. For example, if the service processor is a video decoder, when a game scenario is switched to a video playing scenario, for example, an access bandwidth requirement of the video decoder on a video stored in the DDR memory increases, in this case, the working frequency of the DDR interface in the SoC needs to be adjusted to increase an access bandwidth availability which the SoC accesses the DDR memory.

In this embodiment of this application, when an access bandwidth availability which the service processor accesses the DDR memory changes, the CPU is configured to generate a first frequency adjustment request and output the first frequency adjustment request to the frequency adjustment module, where the first frequency adjustment request includes an initial frequency at which the DDR interface currently works and a first target frequency.

The CPU is configured to generate the first frequency adjustment request and output the first frequency adjustment request to the frequency adjustment module, where the first frequency adjustment request includes an initial frequency at which the DDR interface currently works and a first target frequency.

The frequency adjustment module is configured to determine, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency; obtain a predetermined adjustment amount by which a frequency adjustment coefficient of the spread spectrum clocking generator is adjusted each time and a predetermined interval between two adjacent adjustments, where a frequency adjustment value of the spread spectrum clocking generator corresponding to the adjustment amount is within a locking-in frequency adjustment range of a phase-locked loop in the spread spectrum clocking generator, a working frequency adjustment value of the DDR interface corresponding to the adjustment amount is within a locking-in frequency adjustment range of a delay-locked loop DLL in the DDR interface, and the interval is within a locking-in time range of the phase-locked loop in the spread spectrum clocking generator and a locking-in time range of the DLL in the DDR interface; and gradually adjust the frequency adjustment coefficient of the spread spectrum clocking generator in sequence according to the first frequency adjustment coefficient until the second frequency adjustment coefficient is reached, where an amplitude of each adjustment is the adjustment amount, and a time length between two adjustments is the interval.

After the frequency adjustment module gradually adjusts the frequency adjustment coefficient of the spread spectrum clocking generator to reach the second frequency adjustment coefficient, the spread spectrum clocking generator generates an output frequency according to a fixed input frequency, where the output frequency is a second output frequency. Because there is a fixed ratio relationship between the working frequency of the DDR interface and the output frequency of the spread spectrum clocking generator, it may be known that in this case, the working frequency of the DDR interface and the second output frequency meets the ratio relationship, that is, the working frequency of the DDR interface is the first target frequency, and in this way, the working frequency of the DDR interface is adjusted from the initial frequency to the first target frequency.

In this embodiment of this application, when an access bandwidth requirement on the DDR memory changes, a first frequency adjustment request for the DDR interface is generated using the CPU, and a working frequency of the DDR interface is adjusted. Because during adjustment of the working frequency of the DDR interface, the working frequency of the DDR interface is gradually adjusted according to a predetermined adjustment amount by which a frequency adjustment coefficient of the spread spectrum clocking generator is adjusted each time and a predetermined interval between two adjacent adjustments, it is ensured that a DLL in the DDR interface and a phase-locked loop in the spread spectrum clocking generator are in locking-in states, so that the DDR memory can still be accessed during frequency adjustment of the DDR interface and system performance is ensured.

In a possible design, when the access bandwidth availability which the service processor accesses the DDR memory changes, the CPU is configured to obtain the initial frequency, and determine, in a preconfigured frequency set, the first target frequency, where the first target frequency corresponds to a direction of the change of the access bandwidth. For example, the preconfigured frequency set is a frequency range within which the DDR interface can work; when the access bandwidth availability which the service processor accesses the DDR memory increases, a first target frequency is determined in the preconfigured frequency set, and the first target frequency corresponds to a direction of the change of the access bandwidth, that is, the first working frequency is selected to increase the access bandwidth availability which the service processor accesses the DDR memory.

After the first target frequency is determined, the CPU generates the first frequency adjustment request according to the initial frequency and the first target frequency.

The foregoing describes a specific process of generating the first frequency adjustment request by the CPU, and the first target frequency in the first frequency adjustment request is determined in the preconfigured frequency set, thereby ensuring that the frequency adjustment is in a controllable and effective range.

In another possible design, the frequency adjustment module is configured to obtain the input frequency of the spread spectrum clocking generator and a preconfigured ratio relationship between the working frequency of the DDR interface and the output frequency of the spread spectrum clocking generator; generally, the input frequency of the spread spectrum clocking generator is fixed, the working frequency of the DDR interface and the frequency output by the spread spectrum clocking generator to the DDR interface are in a preconfigured fixed ratio relationship (such as a frequency division relationship or a frequency multiplication relationship), and the ratio may be preconfigured; for example, in a DDR1 system, the working frequency of the DDR interface may be configured to be the same as the output frequency of the spread spectrum clocking generator; in a DDR2 system, the working frequency of the DDR interface may be configured to be twice the output frequency of the spread spectrum clocking generator; and in a DDR3 system, the working frequency of the DDR interface may be configured to be four times the output frequency of the spread spectrum clocking generator; certainly, the foregoing are merely examples, and it is also possible that, for example, in the DDR1 system, the working frequency of the DDR interface may be configured to be twice the input clock rate, and in the DDR2 system, the working frequency of the DDR interface may be configured to be the same as the input clock rate, which is not limited herein; therefore, the input frequency of the spread spectrum clocking generator, and the preconfigured ratio relationship between the working frequency of the DDR interface and the output frequency of the spread spectrum clocking generator may be obtained directly; determine, according to the initial frequency and the ratio relationship, a first output frequency of the spread spectrum clocking generator corresponding to the initial frequency; determine, according to the first target frequency and the ratio relationship, a second output frequency of the spread spectrum clocking generator corresponding to the first target frequency; determine, according to the input frequency and the first output frequency of the spread spectrum clocking generator, the first frequency adjustment coefficient of the spread spectrum clocking generator corresponding to the initial frequency; and determine, according to the input frequency and the second output frequency of the spread spectrum clocking generator, the second frequency adjustment coefficient of the spread spectrum clocking generator corresponding to the first target frequency.

In this way, after the frequency adjustment module receives the first frequency adjustment request, the first frequency adjustment coefficient of the spread spectrum clocking generator corresponding to the initial frequency, and the second frequency adjustment coefficient of the spread spectrum clocking generator corresponding to the first target frequency may be determined, so that the frequency adjustment module subsequently adjusts the frequency adjustment coefficient of the spread spectrum clocking generator based on the first frequency adjustment coefficient and the second frequency adjustment coefficient, thereby achieving an objective of gradually adjusting the working frequency of the DDR interface to the first target frequency.

In another possible design, before obtaining the predetermined adjustment amount by which the frequency adjustment coefficient of the spread spectrum clocking generator is adjusted each time and the predetermined interval between two adjacent adjustments, the frequency adjustment module may determine the adjustment amount and the interval between adjustments in advance. In this case, the frequency adjustment module is further configured to obtain the locking-in frequency adjustment range of the phase-locked loop in the spread spectrum clocking generator, the locking-in frequency adjustment range of the delay-locked loop DLL in the DDR interface, the locking-in time range of the phase-locked loop in the spread spectrum clocking generator, and the locking-in time range of the DLL in the DDR interface; and determine the adjustment amount and the interval, where the frequency adjustment value of the spread spectrum clocking generator corresponding to the adjustment amount is within the locking-in frequency adjustment range of the phase-locked loop in the spread spectrum clocking generator, the working frequency adjustment value of the DDR interface corresponding to the adjustment amount is within the locking-in frequency adjustment range of the delay-locked loop DLL in the DDR interface, and the interval is within the locking-in time range of the phase-locked loop in the spread spectrum clocking generator and the locking-in time range of the DLL in the DDR interface.

In another possible design, after the working frequency of the DDR interface is adjusted from the initial frequency to the first target frequency, the working frequency of the DDR interface may still fail to meet the access bandwidth requirement of the service processor on the DDR memory, that is, the first target frequency cannot satisfy a change of the access bandwidth availability which the service processor accesses the DDR memory. Therefore, in this embodiment of this application, a further adjustment may be performed to adjust the working frequency of the DDR interface from the first target frequency to a second working frequency, and for a detailed adjustment manner, refer to the foregoing process of adjusting the working frequency of the DDR interface from the initial frequency to the first working frequency; and in this case, the CPU is further configured to generate a second frequency adjustment request, where the second frequency adjustment request includes the first target frequency and a second target frequency.

The frequency adjustment module is further configured to determine, according to the second frequency adjustment request, a third frequency adjustment coefficient of the spread spectrum clocking generator corresponding to the first target frequency; and gradually adjust the frequency adjustment coefficient of the spread spectrum clocking generator in sequence according to the second frequency adjustment coefficient until the third frequency adjustment coefficient is reached, where an amplitude of each adjustment is the adjustment amount, and a time length between two adjustments is the interval.

Certainly, in a case in which the working frequency of the DDR interface still does not meet the access bandwidth requirement of the service processor on the DDR memory, the adjustment may be continued until the access bandwidth requirement is met. By performing the foregoing continuous gradual adjustments, the working frequency of the DDR interface may be adjusted to an appropriate frequency, system performance is improved, and normal working of the DDR memory is not affected during the adjustment process.

In this embodiment of this application, the frequency adjustment module may be a processor having a hardware processing capability, for example, another CPU or a processor of another type, such as an application-specific integrated circuit (ASIC), which is not limited herein.

According to a second aspect, an embodiment of this application provides a frequency adjustment method, where the method is applied to an SoC, the SoC includes a CPU, a service processor, a DDR controller, a frequency adjustment module, a DDR interface, and a spread spectrum clocking generator, and the method includes receiving, by the frequency adjustment module, a first frequency adjustment request sent by the CPU, where the first frequency adjustment request is generated by the CPU when an access bandwidth availability which the service processor accesses a DDR memory coupled to the SoC changes, and the first frequency adjustment request includes an initial frequency at which the DDR interface currently works and a first target frequency; determining, by the frequency adjustment module according to the first frequency adjustment request, a first frequency adjustment coefficient of the spread spectrum clocking generator corresponding to the initial frequency, and a second frequency adjustment coefficient of the spread spectrum clocking generator corresponding to the first target frequency; obtaining, by the frequency adjustment module, a predetermined adjustment amount by which a frequency adjustment coefficient of the spread spectrum clocking generator is adjusted each time and a predetermined interval between two adjacent adjustments, where a frequency adjustment value of the spread spectrum clocking generator corresponding to the adjustment amount is within a locking-in frequency adjustment range of a phase-locked loop in the spread spectrum clocking generator, a working frequency adjustment value of the DDR interface corresponding to the adjustment amount is within a locking-in frequency adjustment range of a delay-locked loop DLL in the DDR interface, and the interval is within a locking-in time range of the phase-locked loop in the spread spectrum clocking generator and a locking-in time range of the DLL in the DDR interface; and gradually adjusting, by the frequency adjustment module, the frequency adjustment coefficient of the spread spectrum clocking generator in sequence according to the first frequency adjustment coefficient until the second frequency adjustment coefficient is reached, where an amplitude of each adjustment is the adjustment amount, and a time length between two adjustments is the interval.

In another possible design, before the receiving, by the frequency adjustment module, a first frequency adjustment request sent by the CPU, the method further includes obtaining, by the CPU, the initial frequency; and determining, in a preconfigured frequency set, the first target frequency, where the first target frequency corresponds to a direction of the change of the access bandwidth; and generating, by the CPU, the first frequency adjustment request according to the initial frequency and the first target frequency.

In another possible design, the determining, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency includes obtaining an input frequency of the spread spectrum clocking generator, and a preconfigured ratio relationship between a working frequency of the DDR interface and an output frequency of the spread spectrum clocking generator; determining, according to the initial frequency and the ratio relationship, a first output frequency of the spread spectrum clocking generator corresponding to the initial frequency; determining, according to the first target frequency and the ratio relationship, a second output frequency of the spread spectrum clocking generator corresponding to the first target frequency; determining, according to the input frequency and the first output frequency of the spread spectrum clocking generator, the first frequency adjustment coefficient of the spread spectrum clocking generator corresponding to the initial frequency; and determining, according to the input frequency and the second output frequency of the spread spectrum clocking generator, the second frequency adjustment coefficient of the spread spectrum clocking generator corresponding to the first target frequency.

In another possible design, before the obtaining, by the frequency adjustment module, a predetermined adjustment amount by which a frequency adjustment coefficient of the spread spectrum clocking generator is adjusted each time and a predetermined interval between two adjacent adjustments, the method further includes obtaining, by the frequency adjustment module, the locking-in frequency adjustment range of the phase-locked loop in the spread spectrum clocking generator, the locking-in frequency adjustment range of the delay-locked loop DLL in the DDR interface, the locking-in time range of the phase-locked loop in the spread spectrum clocking generator, and the locking-in time range of the DLL in the DDR interface; and determining the adjustment amount and the interval, where the frequency adjustment value of the spread spectrum clocking generator corresponding to the adjustment amount is within the locking-in frequency adjustment range of the phase-locked loop in the spread spectrum clocking generator, the working frequency adjustment value of the DDR interface corresponding to the adjustment amount is within the locking-in frequency adjustment range of the delay-locked loop DLL in the DDR interface, and the interval is within the locking-in time range of the phase-locked loop in the spread spectrum clocking generator and the locking-in time range of the DLL in the DDR interface.

In another possible design, if the first target frequency cannot satisfy the change of the access bandwidth availability which the service processor accesses the DDR memory, the method further includes generating, by the CPU, a second frequency adjustment request, where the second frequency adjustment request includes the first target frequency and a second target frequency; determining, by the frequency adjustment module according to the second frequency adjustment request, a third frequency adjustment coefficient of the spread spectrum clocking generator corresponding to the first target frequency; and gradually adjusting, by the frequency adjustment module, the frequency adjustment coefficient of the spread spectrum clocking generator in sequence according to the second frequency adjustment coefficient until the third frequency adjustment coefficient is reached, where an amplitude of each adjustment is the adjustment amount, and a time length between two adjustments is the interval.

According to a third aspect, an embodiment of this application provides a terminal, including an SoC and a DDR memory, where the SoC is the SoC according to any possible design of the first aspect, and a DDR interface in the SoC is connected to the DDR memory.

According to a fourth aspect, an embodiment of this application provides a computer storage medium, where the computer storage medium may store a program, and when the program runs, some or all steps of at least the frequency adjustment method in the foregoing method embodiment are performed.

DESCRIPTION OF EMBODIMENTS

Embodiments of this application provide a frequency adjustment method, a System-On-a-Chip, and a terminal, so as to avoid a problem that a DDR memory cannot be accessed during a working frequency switching phase of a DDR interface, thereby ensuring system performance.

To make persons skilled in the art understand the technical solutions in the present application better, the following clearly describes the technical solutions in the embodiments of this application with reference to the accompanying drawings in the embodiments of this application. The described embodiments are merely a part rather than all of the embodiments of this application. All other embodiments obtained by persons of ordinary skill in the art based on the embodiments of the present application without creative efforts shall fall within the protection scope of the present application.

In the specification, claims, and accompanying drawings of this application, the terms "first", "second", and so on (if they exist) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 3:
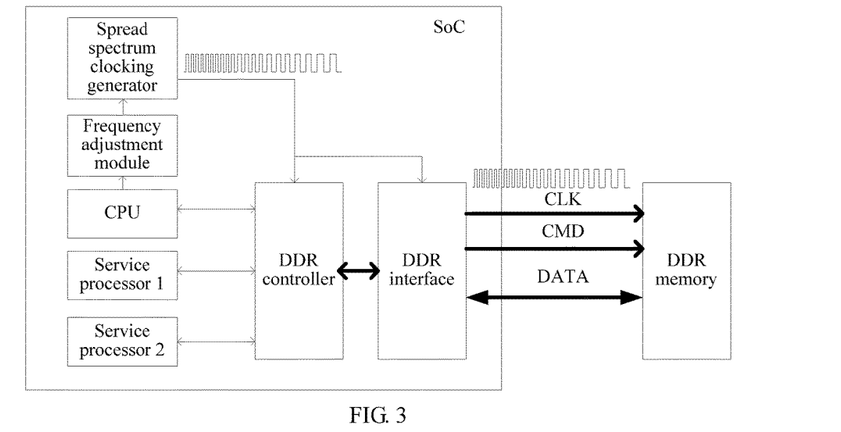
FIG. 3 is a schematic diagram of a combination embodiment of an SoC and a DDR memory according to an embodiment of this application.

As shown in FIG. 3, an embodiment of this application may be applied to any apparatus that includes an SoC system and a DDR memory, and the apparatus may be a terminal, for example, a device such as a mobile phone, a notebook computer, a tablet, and a personal computer. The SoC may include a processor CPU, a service processor, a DDR controller, a DDR interface, and a spread spectrum clocking generator, where the DDR controller is separately connected to the CPU, the service processor, the spread spectrum clocking generator, and the DDR interface. The SoC further includes a frequency adjustment module, where the frequency adjustment module is separately connected to the spread spectrum clocking generator and the CPU. The DDR controller, the DDR interface (also referred to as a DDR PHY), and the DDR memory form a DDR system. In addition, a data channel (DATA channel shown in FIG. 3), a clock channel (CLK channel shown in FIG. 3), a command channel (CMD channel shown in FIG. 3), and the like exist between the DDR interface and the DDR memory. The CPU and the service processor are both connected to the DDR controller.

The CPU is mainly responsible for running an operating system and scheduling service software, and instructions and data for processing need to be obtained from the DDR memory. There may be one or more service processors. For example, when there are multiple service processors (a service processor 1 and a service processor 2 shown in FIG. 3), the service processor 1 may be a video encoder or decoder, which needs to read from and write to the storage of the DDR memory, and generally includes some internal cache units to cache received data and data to be sent; for another example, the service processor 2 may be a network unit, an audio unit, or the like, which needs to read from and write to the storage of the DDR memory, and also generally includes some internal cache units to cache received data and data to be sent. The DDR controller is used to accept DDR read/write requests of the CPU or the service processor, take the responsibility of scheduling priorities of the read/write requests, and return, to the processor or the service processor, data that is obtained from the DDR memory in response to the DDR request. The DDR interface is used to send read/write commands of the DDR controller to a DDR storage unit according to a physical time sequence and take the responsibility of returning data of the DDR memory to the DDR controller according to a time sequence.

The spread spectrum clocking generator has an input frequency and an output frequency. An input clock rate in the spread spectrum clocking generator does not change. The spread spectrum clocking generator has a frequency adjustment coefficient (such as a frequency multiplication coefficient and a frequency division coefficient). By adjusting the frequency adjustment coefficient of the spread spectrum clocking generator, the output frequency of the spread spectrum clocking generator may be adjusted. The spread spectrum clocking generator is configured to receive an input clock rate and output a clock rate to the DDR interface, where the input clock rate received by the spread spectrum clocking generator is the input frequency of the spread spectrum clocking generator, the clock rate output by the spread spectrum clocking generator to the DDR interface is the output frequency of the spread spectrum clocking generator. In this embodiment of the present disclosure, the input frequency of the spread spectrum clocking generator may be set to a fixed value, and may be received from outside of the SoC, or a crystal oscillator may be disposed in the SoC to generate a clock rate, and the clock rate is output to the spread spectrum clocking generator as the input frequency of the spread spectrum clocking generator.

A working frequency of the DDR interface and the output frequency provided by the spread spectrum clocking generator to the DDR interface are in a fixed preset ratio relationship (such as a frequency division relationship or a frequency multiplication relationship). Therefore, by adjusting the output frequency of the spread spectrum clocking generator, the working frequency of the DDR interface is adjusted indirectly. The ratio relationship may be preconfigured. For example, in a DDR1 system, the working frequency of the DDR interface may be configured to be the same as the output frequency of the spread spectrum clocking generator; in a DDR2 system, the working frequency of the DDR interface may be configured to be twice the output frequency of the spread spectrum clocking generator; and in a DDR3 system, the working frequency of the DDR interface may be configured to be four times the output frequency of the spread spectrum clocking generator. Certainly, the foregoing are merely examples, and it is also possible that, for example, in the DDR1 system, the working frequency of the DDR interface may be configured to be twice the input clock rate; and in the DDR2 system, the working frequency of the DDR interface may be configured to be the same as the input clock rate, which is not limited herein.

When the SoC system is working, scenario switching usually occurs, and in this case, an access bandwidth requirement of the SoC system on the DDR memory changes. An access bandwidth requirement of the service processor on the DDR memory changes. The service processor may be an audio or a video encoder or decoder, a network unit, or the like. For example, if the service processor is a video decoder, when a game scenario is switched to a video playing scenario, for example, an access bandwidth requirement of the video decoder on a video stored in the DDR memory increases, in this case, the working frequency of the DDR interface in the SoC needs to be adjusted to increase an access bandwidth availability which the SoC accesses the DDR memory.

In this embodiment of this application, when an access bandwidth availability which the service processor accesses the DDR memory changes, the CPU is configured to generate a first frequency adjustment request and output the first frequency adjustment request to the frequency adjustment module, where the first frequency adjustment request includes an initial frequency at which the DDR interface currently works and a first target frequency.

The CPU is configured to generate the first frequency adjustment request and output the first frequency adjustment request to the frequency adjustment module, where the first frequency adjustment request includes an initial frequency at which the DDR interface currently works and a first target frequency.

The frequency adjustment module is configured to determine, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency; obtain a predetermined adjustment amount by which a frequency adjustment coefficient of the spread spectrum clocking generator is adjusted each time and a predetermined interval between two adjacent adjustments.

Because the DDR interface includes a DLL, each memory granularity of the DDR memory includes a DLL, and the DDR memory may be a DDRx SDRAM (x refers to a DDR version number, such as a DDR1 SDRAM, a DDR2 SDRAM, and DDR3 SDRAM). Generally, the DLL in the memory granularity of the DDRx SDRAM and the DLL in the DDR interface have fixed locking-in frequency adjustment ranges (the locking-in frequency adjustment range of the DLL in the DDR memory is usually the same as that of the DLL in the DDR interface) and fixed locking-in adjustment intervals. That is, within the locking-in frequency adjustment range and the interval, a change of a clock rate does not cause out-of-lock of the DLL in the memory granularity of the DDRx SDRAM and the DLL in the DDR interface. Similarly, the spread spectrum clocking generator also has a phase-locked loop therein, and the phase-locked loop also has a fixed locking-in frequency adjustment range and a fixed locking-in adjustment time interval.

Therefore, a frequency adjustment value of the spread spectrum clocking generator corresponding to the adjustment amount is within the locking-in frequency adjustment range of the phase-locked loop in the spread spectrum clocking generator, a working frequency adjustment value of the DDR interface corresponding to the adjustment amount is within the locking-in frequency adjustment range of the DLL in the DDR interface, and the interval is within the locking-in time range of the phase-locked loop in the spread spectrum clocking generator and the locking-in time range of the DLL in the DDR interface.

The frequency adjustment coefficient of the spread spectrum clocking generator is gradually adjusted in sequence according to the first frequency adjustment coefficient until the second frequency adjustment coefficient is reached, where an amplitude of each adjustment is the adjustment amount, and a time length between two adjustments is the interval.

After the frequency adjustment module gradually adjusts the frequency adjustment coefficient of the spread spectrum clocking generator to reach the second frequency adjustment coefficient, the spread spectrum clocking generator generates an output frequency according to a fixed input frequency, where the output frequency is a second output frequency. Because there is a fixed ratio relationship between the working frequency of the DDR interface and the output frequency of the spread spectrum clocking generator, it may be known that in this case, the working frequency of the DDR interface and the second output frequency are in the ratio relationship, that is, the working frequency of the DDR interface is the first target frequency, and in this way, the working frequency of the DDR interface is adjusted from the initial frequency to the first target frequency.

In this embodiment of this application, when a service access bandwidth requirement on the DDR system changes, a first frequency adjustment request for the DDR interface is generated using the CPU, and a working frequency of the DDR interface is adjusted. Because during adjustment of the working frequency of the DDR interface, the working frequency of the DDR interface is gradually adjusted according to a predetermined adjustment amount by which a frequency adjustment coefficient of the spread spectrum clocking generator is adjusted each time and a predetermined interval between two adjacent adjustments, it is ensured that a DLL in the DDR interface and a phase-locked loop in the spread spectrum clocking generator are in locking-in states, so that the DDR memory can still be accessed during frequency adjustment of the DDR interface and system performance is ensured.

Further, when the access bandwidth availability which the service processor accesses the DDR memory changes, the CPU is configured to obtain the initial frequency, and determine, in a preconfigured frequency set, the first target frequency, where the first target frequency corresponds to a direction of the change of the access bandwidth. For example, the preconfigured frequency set is a frequency range within which the DDR interface can work; when the access bandwidth availability which the service processor accesses the DDR memory increases, a first target frequency is determined in the preconfigured frequency set, and the first target frequency corresponds to a direction of the change of the access bandwidth, that is, the first working frequency is selected to increase the access bandwidth availability which the service processor accesses the DDR memory.

After the first target frequency is determined, the CPU generates the first frequency adjustment request according to the initial frequency and the first target frequency.

Further, the frequency adjustment module is configured to obtain the input frequency of the spread spectrum clocking generator and a preconfigured ratio relationship between the working frequency of the DDR interface and the output frequency of the spread spectrum clocking generator, where because the working frequency of the DDR interface and the frequency output by the spread spectrum clocking generator to the DDR interface are in a preconfigured fixed ratio relationship (such as a frequency division relationship or a frequency multiplication relationship), the input frequency of the spread spectrum clocking generator, and the preconfigured ratio relationship between the working frequency of the DDR interface and the output frequency of the spread spectrum clocking generator may be obtained directly; determine, according to the initial frequency and the ratio relationship, a first output frequency of the spread spectrum clocking generator corresponding to the initial frequency; determine, according to the first target frequency and the ratio relationship, a second output frequency of the spread spectrum clocking generator corresponding to the first target frequency; determine, according to the input frequency and the first output frequency of the spread spectrum clocking generator, the first frequency adjustment coefficient of the spread spectrum clocking generator corresponding to the initial frequency; and determine, according to the input frequency and the second output frequency of the spread spectrum clocking generator, the second frequency adjustment coefficient of the spread spectrum clocking generator corresponding to the first target frequency.

In this way, after the frequency adjustment module receives the first frequency adjustment request, the first frequency adjustment coefficient of the spread spectrum clocking generator corresponding to the initial frequency, and the second frequency adjustment coefficient of the spread spectrum clocking generator corresponding to the first target frequency may be determined, so that the frequency adjustment module subsequently adjusts the frequency adjustment coefficient of the spread spectrum clocking generator based on the first frequency adjustment coefficient and the second frequency adjustment coefficient, thereby achieving an objective of gradually adjusting the working frequency of the DDR interface to the first target frequency.

Further, before obtaining the predetermined adjustment amount by which the frequency adjustment coefficient of the spread spectrum clocking generator is adjusted each time and the predetermined interval between two adjacent adjustments, the frequency adjustment module may determine the adjustment amount and the interval between adjustments in advance. In this case, the frequency adjustment module is further configured to obtain the locking-in frequency adjustment range of the phase-locked loop in the spread spectrum clocking generator, the locking-in frequency adjustment range of the DLL in the DDR interface, the locking-in time range of the phase-locked loop in the spread spectrum clocking generator, and the locking-in time range of the DLL in the DDR interface; and determine the adjustment amount and the interval, where the frequency adjustment value of the spread spectrum clocking generator corresponding to the adjustment amount is within the locking-in frequency adjustment range of the phase-locked loop in the spread spectrum clocking generator, the working frequency adjustment value of the DDR interface corresponding to the adjustment amount is within the locking-in frequency adjustment range of the DLL in the DDR interface, and the interval is within the locking-in time range of the phase-locked loop in the spread spectrum clocking generator and the locking-in time range of the DLL in the DDR interface.

Further, after the working frequency of the DDR interface is adjusted from the initial frequency to the first target frequency, the working frequency of the DDR interface may still fail to meet the access bandwidth requirement of the service processor on the DDR memory, that is, the first target frequency cannot satisfy a change of the access bandwidth availability which the service processor accesses the DDR memory. Therefore, in this embodiment of this application, a further adjustment may be performed to adjust the working frequency of the DDR interface from the first target frequency to a second working frequency, and for a detailed adjustment manner, refer to the foregoing process of adjusting the working frequency of the DDR interface from the initial frequency to the first working frequency; and in this case, the CPU is further configured to generate a second frequency adjustment request, where the second frequency adjustment request includes the first target frequency and a second target frequency.

The frequency adjustment module is further configured to determine, according to the second frequency adjustment request, a third frequency adjustment coefficient of the spread spectrum clocking generator corresponding to the first target frequency; and gradually adjust the frequency adjustment coefficient of the spread spectrum clocking generator in sequence according to the second frequency adjustment coefficient until the third frequency adjustment coefficient is reached, where an amplitude of each adjustment is the adjustment amount, and a time length between two adjustments is the interval.

Certainly, in a case in which the working frequency of the DDR interface still does not meet the access bandwidth requirement of the service processor on the DDR memory, the adjustment may be continued until the access bandwidth requirement is met. By performing the foregoing continuous gradual adjustments, the working frequency of the DDR interface may be adjusted to an appropriate frequency, system performance is improved, and normal working of the DDR memory is not affected during the adjustment process.

In this embodiment of this application, the frequency adjustment module may be a processor having a hardware processing capability, for example, another CPU or a processor of another type, such as an ASIC, which is not limited herein.

Figure 4:
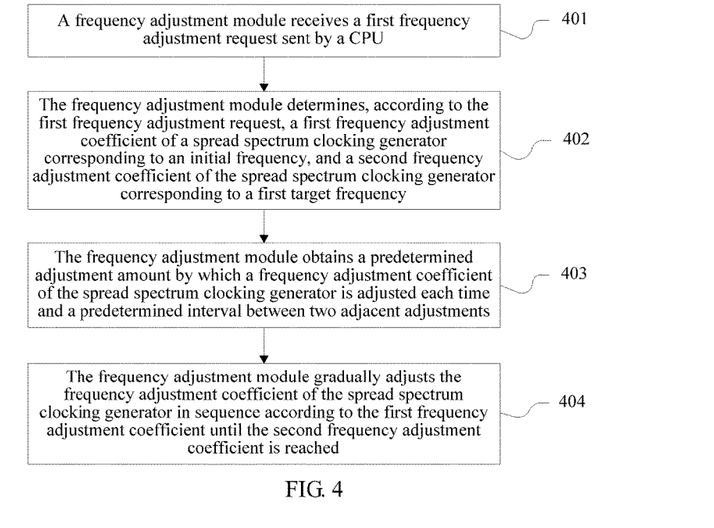
FIG. 4 is a schematic diagram of an embodiment of a frequency adjustment method according to an embodiment of this application.

The following describes an embodiment of a frequency adjustment method in a DDR system according to an embodiment of this application. The method is applied in an SoC, and the SoC includes a central processing unit CPU, a service processor, a DDR controller, a DDR interface, and a spread spectrum clocking generator. Referring to FIG. 4, FIG. 4 shows an embodiment of a frequency adjustment method according to an embodiment of this application, where the method includes the following steps.

Step 401: A frequency adjustment module receives a first frequency adjustment request sent by the CPU.

The first frequency adjustment request is generated by the CPU when an access bandwidth availability which the service processor accesses a DDR memory coupled to the SoC changes, and the first frequency adjustment request includes an initial frequency at which the DDR interface currently works and a first target frequency.

When the SoC is working, scenario switching usually occurs, for example, a video playing scenario is switched to a game scenario, and in this case, an access bandwidth requirement of the SoC on the DDR memory changes. An access bandwidth requirement of the service processor (such as the foregoing service processor 1 or the service processor 2) in the SoC on the DDR system may change (be increased or decreased). In this case, the working frequency of the DDR interface needs to be adjusted to adapt to the change of the scenario, thereby achieving objectives of reducing system power consumption and improving system performance.

Before the frequency adjustment module receives the first frequency adjustment request sent by the CPU, the method may further include obtaining, by the CPU, the initial frequency; determining, in a preconfigured frequency set, the first target frequency, where the first target frequency corresponds to a direction of the change of the access bandwidth; and generating, by the CPU, the first frequency adjustment request according to the initial frequency and the first target frequency.

Step 402: The frequency adjustment module determines, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency.

Determining, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency may include obtaining an input frequency of the spread spectrum clocking generator, and a preconfigured ratio relationship between a working frequency of the DDR interface and an output frequency of the spread spectrum clocking generator; determining, according to the initial frequency and the ratio relationship, a first output frequency of the spread spectrum clocking generator corresponding to the initial frequency; determining, according to the first target frequency and the ratio relationship, a second output frequency of the spread spectrum clocking generator corresponding to the first target frequency; determining, according to the input frequency and the first output frequency of the spread spectrum clocking generator, the first frequency adjustment coefficient of the spread spectrum clocking generator corresponding to the initial frequency; and determining, according to the input frequency and the second output frequency of the spread spectrum clocking generator, the second frequency adjustment coefficient of the spread spectrum clocking generator corresponding to the first target frequency.

Step 403: The frequency adjustment module obtains a predetermined adjustment amount by which a frequency adjustment coefficient of the spread spectrum clocking generator is adjusted each time and a predetermined interval between two adjacent adjustments.

A frequency adjustment value of the spread spectrum clocking generator corresponding to the adjustment amount is within a locking-in frequency adjustment range of a phase-locked loop in the spread spectrum clocking generator, a working frequency adjustment value of the DDR interface corresponding to the adjustment amount is within a locking-in frequency adjustment range of a DLL in the DDR interface, and the interval is within a locking-in time range of the phase-locked loop in the spread spectrum clocking generator and a locking-in time range of the DLL in the DDR interface.

Step 404: The frequency adjustment module gradually adjusts the frequency adjustment coefficient of the spread spectrum clocking generator in sequence according to the first frequency adjustment coefficient until the second frequency adjustment coefficient is reached.

An amplitude of each adjustment is the adjustment amount, and a time length between two adjustments is the interval.

After the frequency adjustment module gradually adjusts the frequency adjustment coefficient of the spread spectrum clocking generator to reach the second frequency adjustment coefficient, the spread spectrum clocking generator generates an output frequency according to a fixed input frequency, where the output frequency is a second output frequency. Because there is a fixed ratio relationship between the working frequency of the DDR interface and the output frequency of the spread spectrum clocking generator, it may be known that in this case, the working frequency of the DDR interface and the second output frequency are in the ratio relationship, that is, the working frequency of the DDR interface is the first target frequency, and in this way, the working frequency of the DDR interface is adjusted from the initial frequency to the first target frequency.

Optionally, before the frequency adjustment module obtains the predetermined adjustment amount by which the frequency adjustment coefficient of the spread spectrum clocking generator is adjusted each time and the predetermined interval between two adjacent adjustments, the method further includes obtaining the locking-in frequency adjustment range of the phase-locked loop in the spread spectrum clocking generator, the locking-in frequency adjustment range of the DLL in the DDR interface, the locking-in time range of the phase-locked loop in the spread spectrum clocking generator, and the locking-in time range of the DLL in the DDR interface; and determining the adjustment amount and the interval, where the frequency adjustment value of the spread spectrum clocking generator corresponding to the adjustment amount is within the locking-in frequency adjustment range of the phase-locked loop in the spread spectrum clocking generator, the working frequency adjustment value of the DDR interface corresponding to the adjustment amount is within the locking-in frequency adjustment range of the DLL in the DDR interface, and the interval is within the locking-in time range of the phase-locked loop in the spread spectrum clocking generator and the locking-in time range of the DLL in the DDR interface.

Optionally, if the first target frequency cannot satisfy the change of the access bandwidth availability which the service processor accesses the DDR memory, the method further includes generating, by the CPU, a second frequency adjustment request, where the second frequency adjustment request includes the first target frequency and a second target frequency; determining, by the frequency adjustment module according to the second frequency adjustment request, a third frequency adjustment coefficient of the spread spectrum clocking generator corresponding to the first target frequency; and gradually adjusting the frequency adjustment coefficient of the spread spectrum clocking generator in sequence according to the second frequency adjustment coefficient until the third frequency adjustment coefficient is reached, where an amplitude of each adjustment is the adjustment amount, and a time length between two adjustments is the interval.

An embodiment of this application further provides a terminal. The terminal includes an SoC and a DDR memory, the SoC is any possible SoC described in the foregoing, and a DDR interface in the SoC is connected to the DDR memory.

The following describes the terminal in this embodiment of the present disclosure from the perspective of hardware processing.

Figure 5:
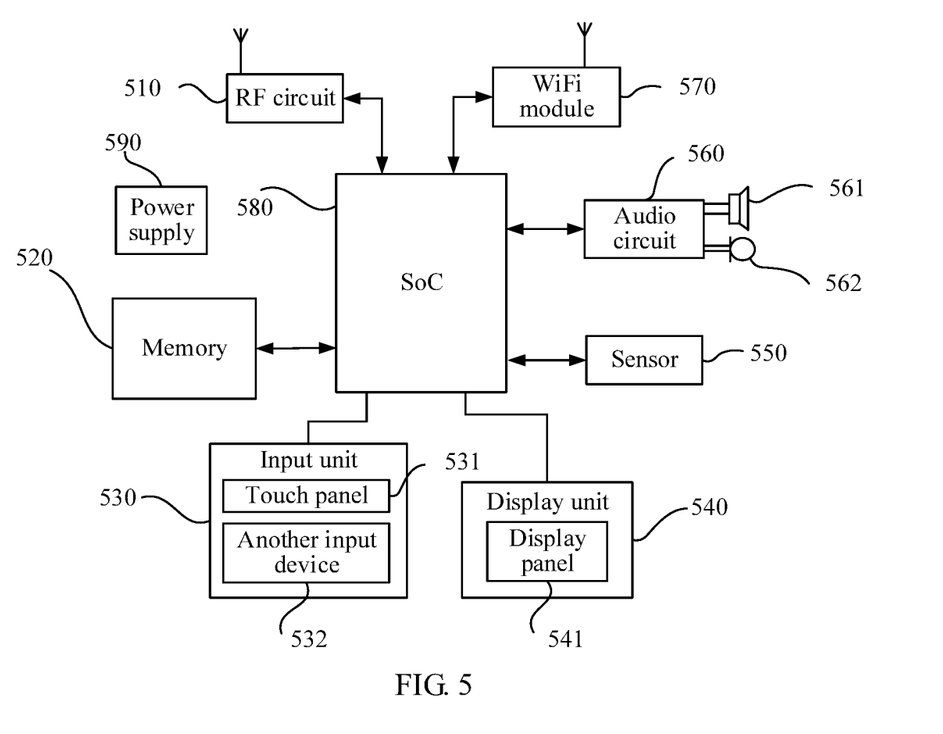
FIG. 5 is a schematic diagram of an embodiment of a terminal according to an embodiment of this application.

FIG. 5 is a block diagram of a partial structure related to a terminal according to an embodiment of this application. Referring to FIG. 5, the terminal includes a radio frequency (RF) circuit 510, a memory 520, an input unit 530, a display unit 540, a sensor 550, an audio circuit 560, a WiFi module 570, an SoC 580, a power supply 590, and the like.

The SoC is the SoC in the embodiments of this application (for details, refer to the foregoing embodiments, and details are not described herein again). The memory 520 includes a DDR memory. Certainly, the memory 520 may further include a high-speed random access memory, or include another storage unit such as a non-volatile memory, for example, at least one magnetic disk storage device, a flash memory device, or another volatile solid-state storage device.

Persons skilled in the art may understand that the terminal structure shown in FIG. 5 constitutes no limitation to the terminal, and the terminal may include more or fewer components than those shown in the figure, or some components may be combined, or a different component deployment may be used.

The following describes composition components of the terminal in detail with reference to FIG. 5.

The RF circuit 510 may be configured to receive and send a signal during an information sending and receiving process or during a call. After receiving downlink information of a base station, the RF circuit 510 sends the downlink information of the base station to the SoC 580 for processing, and in addition, the RF circuit 510 sends uplink relevant data to the base station. Generally, the RF circuit 510 includes, but is not limited to, an antenna, at least one amplifier, a transceiver, a coupler, a low noise amplifier (LNA), a duplexer, and the like. In addition, the RF circuit 510 may also communicate with a network and another device by means of wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 520 may be configured to store a software program and module. By running the software program and module stored in the memory 520, the SoC 580 performs various functional applications of the terminal and data processing. The memory 520 may mainly include a program storage area and a data storage area, where the program storage area may store an operating system, an application program required by at least one function (such as a sound playback function and an image display function), and the like; and the program storage area may store data (such as audio data and an address book) created according to the use of the terminal, and the like.

The input unit 530 may be configured to receive an input digit or character information, and generate a keyboard signal input related to user settings and function control. The input unit 530 may include a touch panel 531 and another input device 532. The touch panel 531, also referred to as a touchscreen, may collect a touch operation of a user on or near the touch panel 531 (such as an operation of a user on the touch panel 531 or near the touch panel 531 using any suitable object or accessory such as a finger or a stylus), and drive a corresponding connection apparatus according to a preset program. Optionally, the touch panel 531 may include two parts: a touch detection apparatus and a touch controller. The touch detection apparatus detects a touch orientation of a user, detects a signal brought by a touch operation, and sends the signal to the touch controller. The touch controller receives touch information from the touch detection apparatus, converts the touch information to touch point coordinates, and then sends the touch point coordinates to the SoC 580, and the touch controller can receive and execute a command sent by the SoC 580. In addition, the touch panel 531 may be implemented in various types such as resistance-type, capacitance-type, infrared, and surface acoustic wave. Besides the touch panel 531, the input unit 530 may further include another input device 532. The another input device 532 may include, but is not limited to, one or more of a physical keyboard, a functional key (such as a volume control key and a switch key), a trackball, a mouse, or a joystick.

The display unit 540 may be configured to display information input by a user or information provided to a user, and various menus of the terminal. The display unit 540 may include a display panel 541. Optionally, the display panel 541 may be configured using a liquid crystal display (LCD), an organic light-emitting diode (OLED), or the like. Further, the touch panel 531 may cover the display panel 541. After detecting a touch operation on the touch panel 531 or near the touch panel 531, the touch panel 531 sends the touch operation to the SoC 580 to determine a type of a touch event, and then the SoC 580 provides corresponding visual output on the display panel 541 according to the type of the touch event. Although in FIG. 5, the touch panel 531 and the display panel 541 are used as two independent components to implement input and output functions of the terminal, in some embodiments, the touch panel 531 and the display panel 541 may be integrated to implement the input and output functions of the terminal.

The terminal may further include at least one sensor 550, for example, an optical sensor, a motion sensor, and another sensor. The optical sensor may include an ambient light sensor and a proximity sensor, where the ambient light sensor may adjust brightness of the display panel 541 according to luminance of the ambient light, and the proximity sensor may switch off the display panel 541 and/or backlight when the terminal is moved to the ear. As one type of a motion sensor, an acceleration sensor may detect sizes of accelerations in various directions (generally on three axes), and when the acceleration sensor is static, the acceleration sensor may detect a size and a direction of the gravity, and may be applied to an application that recognizes an attitude of the terminal (for example, switching between landscape orientation and portrait orientation, a related game, and magnetometer attitude calibration), a function related to vibration recognition (such as a pedometer and a knock), and the like. Another sensor such as a gyroscope, a barometer, a hygrometer, a thermometer, and an infrared sensor may be configured in the terminal, and details are not described herein again.

The audio circuit 560, a loudspeaker 561, and a microphone 562 may provide audio interfaces between a user and the terminal. The audio circuit 560 may convert received audio data into an electric signal and transmit the electric signal to the loudspeaker 561, and the loudspeaker 561 converts the electric signal into a sound signal for output. On the other hand, the microphone 562 converts a collected sound signal into an electric signal, the audio circuit 560 receives the electric signal and converts the electric signal into audio data, outputs the audio data to the SoC 580 for processing, and then the SoC 580 sends the audio data to, for example, another terminal using the RF circuit 510, or outputs the audio data to the memory 520 for further processing.

WiFi is a short distance wireless transmission technology. The terminal may help, using the WiFi module 570, a user to receive and send e-mails, browse a webpage, access streaming media, and the like, and it provides wireless broadband Internet access for the user. Although FIG. 5 shows the WiFi module 570, it may be understood that the WiFi module is not a necessary component of the terminal, and when required, the WiFi module may be omitted as long as the scope of the essence of the present disclosure is not changed.

The SoC 580 is a control center of the terminal, and connects various parts of the whole terminal using various interfaces and lines. By running or executing the software program and/or module stored in the memory 520, and invoking data stored in the memory 520, the SoC 580 performs various functions and/or data processing of the terminal, thereby performing overall monitoring on the terminal. Optionally, the SoC 580 may include multiple processing units, such as a CPU or various service processors. Preferably, the SoC 580 may integrate an application processor and a modem processor, where the application processor mainly processes an operating system, a user interface, an application program, and the like; and the modem processor mainly processes wireless communication. It may be understood that the foregoing modem processor may not be integrated into the SoC 580.

The terminal further includes the power supply 590 (such as a battery) supplying power to each component. Preferably, the power supply may be connected to the SoC 580 using a power supply management system, thereby implementing a function such as charging and discharging management, and power consumption management.

Although not shown in the figure, the terminal may further include a camera, a Bluetooth® module, and the like, and details are not described herein.

Persons skilled in the art may clearly know that, for convenience and conciseness of description, in the foregoing embodiments, the embodiments emphasize different aspects, and for a part not described in detail in one embodiment, refer to relevant description of another embodiment.

It should be noted that, for brief description, the foregoing method embodiments are represented as a series of actions. However, persons skilled in the art should appreciate that the present application is not limited to the described order of the actions, because according to this application, some steps may be performed in another order or simultaneously. It should be further appreciated by persons skilled in the art that the embodiments described in this specification all belong to preferred embodiments, and the involved actions and modules are not necessarily required by the present application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A System-On-a-Chip (SoC), comprising:
   a central processing unit (CPU);
   a service processor;
   a double data rate synchronous dynamic random access memory (DDR) interface;
   a spread spectrum clocking generator;
   a DDR controller separately connected to the CPU, the service processor, the spread spectrum clocking generator, and the DDR interface; and
   a frequency adjustment module separately connected to the spread spectrum clocking generator and the CPU,
   wherein the service processor is configured to access, using the DDR controller and the DDR interface, a DDR memory coupled to the SoC,
   wherein the spread spectrum clocking generator is configured to receive an input clock rate and output a clock rate to the DDR interface,
   wherein the CPU is configured to generate a first frequency adjustment request and output the first frequency adjustment request to the frequency adjustment module when an access bandwidth availability which the service processor accesses the DDR memory changes, wherein the first frequency adjustment request comprises an initial frequency at which the DDR interface currently works and a first target frequency, and wherein the frequency adjustment module is configured to:

determine, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency;

obtain a predetermined adjustment amount by which a frequency adjustment coefficient of the spread spectrum clocking generator is adjusted each time and a predetermined interval between two adjacent adjustments, wherein a frequency adjustment value of the spread spectrum clocking generator corresponding to the predetermined adjustment amount is within a locking-in frequency adjustment range of a phase-locked loop in the spread spectrum clocking generator, wherein a working frequency adjustment value of the DDR interface corresponding to the predetermined adjustment amount is within a locking-in frequency adjustment range of a delay-locked loop (DLL) in the DDR interface, and wherein the predetermined interval is within a locking-in time range of the phase-locked loop in the spread spectrum clocking generator and a locking-in time range of the DLL in the DDR interface; and gradually adjust the frequency adjustment coefficient of the spread spectrum clocking generator from the first frequency adjustment coefficient to the second frequency adjustment coefficient in sequence, wherein an amplitude of each adjustment is the predetermined adjustment amount, and wherein a time length between two adjustments is the predetermined interval.

2. The SoC according to claim 1, wherein when the access bandwidth availability which the service processor accesses the DDR memory changes, the CPU is further configured to:
obtain the initial frequency;
determine, in a preconfigured frequency set, the first target frequency, wherein the first target frequency corresponds to a direction of the change of the access bandwidth; and
generate the first frequency adjustment request according to the initial frequency and the first target frequency.

3. The SoC according to claim 1, wherein the frequency adjustment module is further configured to:
obtain an input frequency of the spread spectrum clocking generator, and a preconfigured ratio relationship between a working frequency of the DDR interface and an output frequency of the spread spectrum clocking generator;
determine, according to the initial frequency and the preconfigured ratio relationship, a first output frequency of the spread spectrum clocking generator corresponding to the initial frequency;
determine, according to the first target frequency and the preconfigured ratio relationship, a second output frequency of the spread spectrum clocking generator corresponding to the first target frequency;
determine, according to the input frequency and the first output frequency of the spread spectrum clocking generator, the first frequency adjustment coefficient of the spread spectrum clocking generator corresponding to the initial frequency; and
determine, according to the input frequency and the second output frequency of the spread spectrum clocking generator, the second frequency adjustment coefficient of the spread spectrum clocking generator corresponding to the first target frequency.

4. The SoC according to claim 1, wherein before obtaining the predetermined adjustment amount by which the frequency adjustment coefficient of the spread spectrum clocking generator is adjusted each time and the predetermined interval between two adjacent adjustments, the frequency adjustment module is further configured to:
obtain the locking-in frequency adjustment range of the phase-locked loop in the spread spectrum clocking generator, the locking-in frequency adjustment range of the DLL in the DDR interface, the locking-in time range of the phase-locked loop in the spread spectrum clocking generator, and the locking-in time range of the DLL in the DDR interface; and
determine the predetermined adjustment amount and the predetermined interval, wherein the frequency adjustment value of the spread spectrum clocking generator corresponding to the predetermined adjustment amount is within the locking-in frequency adjustment range of the phase-locked loop in the spread spectrum clocking generator, wherein the working frequency adjustment value of the DDR interface corresponding to the predetermined adjustment amount is within the locking-in frequency adjustment range of the DLL in the DDR interface, and wherein the predetermined interval is within the locking-in time range of the phase-locked loop in the spread spectrum clocking generator and the locking-in time range of the DLL in the DDR interface.

5. The SoC according to claim 1, wherein when the first target frequency cannot satisfy the change of the access bandwidth availability which the service processor accesses the DDR memory, the CPU is further configured to generate a second frequency adjustment request, wherein the second frequency adjustment request comprises the first target frequency and a second target frequency, and wherein the frequency adjustment module is further configured to:
determine, according to the second frequency adjustment request, a third frequency adjustment coefficient of the spread spectrum clocking generator corresponding to the first target frequency; and
gradually adjust the frequency adjustment coefficient of the spread spectrum clocking generator in sequence according to the second frequency adjustment coefficient until the third frequency adjustment coefficient is reached, wherein an amplitude of each adjustment is the predetermined adjustment amount, and a time length between two adjustments is the predetermined interval.

6. A frequency adjustment method, applied to a System-On-a-Chip (SoC), wherein the SoC comprises a central processing unit (CPU), a service processor, a frequency adjustment module, a spread spectrum clocking generator, and a double data rate synchronous dynamic random access memory (DDR) interface, and wherein the method comprises:
receiving, by the frequency adjustment module, a first frequency adjustment request sent by the CPU, wherein the first frequency adjustment request is generated by the CPU when an access bandwidth availability which the service processor accesses a DDR memory coupled to the SoC changes, and wherein the first frequency adjustment request comprises an initial frequency at which the DDR interface currently works and a first target frequency;

determining, by the frequency adjustment module according to the first frequency adjustment request, a first frequency adjustment coefficient of the spread spectrum clocking generator corresponding to the initial frequency, and a second frequency adjustment coefficient of the spread spectrum clocking generator corresponding to the first target frequency;

obtaining, by the frequency adjustment module, a predetermined adjustment amount by which a frequency adjustment coefficient of the spread spectrum clocking generator is adjusted each time and a predetermined interval between two adjacent adjustments, wherein a frequency adjustment value of the spread spectrum clocking generator corresponding to the predetermined adjustment amount is within a locking-in frequency adjustment range of a phase-locked loop in the spread spectrum clocking generator, wherein a working frequency adjustment value of the DDR interface corresponding to the predetermined adjustment amount is within a locking-in frequency adjustment range of a delay-locked loop (DLL) in the DDR interface and wherein the predetermined interval is within a locking-in time range of the phase-locked loop in the spread spectrum clocking generator and a locking-in time range of the DLL in the DDR interface; and gradually adjusting, by the frequency adjustment module, the frequency adjustment coefficient of the spread spectrum clocking generator in sequence according to the first frequency adjustment coefficient until the second frequency adjustment coefficient is reached, wherein an amplitude of each adjustment is the predetermined adjustment amount, and wherein a time length between two adjustments is the predetermined interval.

7. The method according to claim 6, wherein before receiving, by the frequency adjustment module, the first frequency adjustment request sent by the CPU, the method further comprises:

obtaining, by the CPU, the initial frequency;

determining, in a preconfigured frequency set, the first target frequency, wherein the first target frequency corresponds to a direction of the change of the access bandwidth; and generating, by the CPU, the first frequency adjustment request according to the initial frequency and the first target frequency.

8. The method according to claim 6, wherein determining, according to the first frequency adjustment request, the first frequency adjustment coefficient of the spread spectrum clocking generator corresponding to the initial frequency, and the second frequency adjustment coefficient of the spread spectrum clocking generator corresponding to the first target frequency comprises:

obtaining an input frequency of the spread spectrum clocking generator, and a preconfigured ratio relationship between a working frequency of the DDR interface and an output frequency of the spread spectrum clocking generator;

determining, according to the initial frequency and the preconfigured ratio relationship, a first output frequency of the spread spectrum clocking generator corresponding to the initial frequency;

determining, according to the first target frequency and the preconfigured ratio relationship, a second output frequency of the spread spectrum clocking generator corresponding to the first target frequency;

determining, according to the input frequency and the first output frequency of the spread spectrum clocking generator, the first frequency adjustment coefficient of the spread spectrum clocking generator corresponding to the initial frequency; and determining, according to the input frequency and the second output frequency of the spread spectrum clocking generator, the second frequency adjustment coefficient of the spread spectrum clocking generator corresponding to the first target frequency.

9. The method according to claim 6, wherein before obtaining, by the frequency adjustment module, the predetermined adjustment amount by which the frequency adjustment coefficient of the spread spectrum clocking generator is adjusted each time and the predetermined interval between two adjacent adjustments, the method further comprises:

obtaining, by the frequency adjustment module, the locking-in frequency adjustment range of the phase-locked loop in the spread spectrum clocking generator, the locking-in frequency adjustment range of the DLL in the DDR interface, the locking-in time range of the phase-locked loop in the spread spectrum clocking generator, and the locking-in time range of the DLL in the DDR interface; and determining the predetermined adjustment amount and the predetermined interval, wherein the frequency adjustment value of the spread spectrum clocking generator corresponding to the predetermined adjustment amount is within the locking-in frequency adjustment range of the phase-locked loop in the spread spectrum clocking generator, wherein the working frequency adjustment value of the DDR interface corresponding to the predetermined adjustment amount is within the locking-in frequency adjustment range of the DLL in the DDR interface, and wherein the predetermined interval is within the locking-in time range of the phase-locked loop in the spread spectrum clocking generator and the locking-in time range of the DLL in the DDR interface.

10. The method according to claim 6, wherein when the first target frequency cannot satisfy the change of the access bandwidth availability which the service processor accesses the DDR memory, the method further comprises:

generating, by the CPU, a second frequency adjustment request, wherein the second frequency adjustment request comprises the first target frequency and a second target frequency;

determining, by the frequency adjustment module according to the second frequency adjustment request, a third frequency adjustment coefficient of the spread spectrum clocking generator corresponding to the first target frequency; and gradually adjusting, by the frequency adjustment module, the frequency adjustment coefficient of the spread spectrum clocking generator in sequence according to the second frequency adjustment coefficient until the third frequency adjustment coefficient is reached, wherein an amplitude of each adjustment is the predetermined adjustment amount, and wherein a time length between two adjustments is the predetermined interval.

11. A terminal, comprising:

a double data rate synchronous dynamic random access memory (DDR) memory; and a System-On-a-Chip (SoC) comprising:

a central processing unit (CPU);
a service processor;
a DDR interface connected to the DDR memory;
a spread spectrum clocking generator;
a DDR controller separately connected to the CPU, the service processor, the spread spectrum clocking generator, and the DDR interface; and
a frequency adjustment module separately connected to the spread spectrum clocking generator and the CPU,
wherein the service processor is configured to access, using the DDR controller and the DDR interface, the DDR memory coupled to the SoC,
wherein the spread spectrum clocking generator is configured to receive an input clock rate and output a clock rate to the DDR interface,
wherein the CPU is configured to generate a first frequency adjustment request and output the first frequency adjustment request to the frequency adjustment module when an access bandwidth availability which the service processor accesses the DDR memory changes,
wherein the first frequency adjustment request comprises an initial frequency at which the DDR interface currently works and a first target frequency, and
wherein the frequency adjustment module is configured to:
determine, according to the first frequency adjustment request, a first frequency adjustment coefficient of the spread spectrum clocking generator corresponding to the initial frequency, and a second frequency adjustment coefficient of the spread spectrum clocking generator corresponding to the first target frequency;
obtain a predetermined adjustment amount by which a frequency adjustment coefficient of the spread spectrum clocking generator is adjusted each time and a predetermined interval between two adjacent adjustments, wherein a frequency adjustment value of the spread spectrum clocking generator corresponding to the predetermined adjustment amount is within a locking-in frequency adjustment range of a phase-locked loop in the spread spectrum clocking generator, wherein a working frequency adjustment value of the DDR interface corresponding to the predetermined adjustment amount is within a locking-in frequency adjustment range of a delay-locked loop (DLL) in the DDR interface, and wherein the predetermined interval is within a locking-in time range of the phase-locked loop in the spread spectrum clocking generator and a locking-in time range of the DLL in the DDR interface; and
gradually adjust the frequency adjustment coefficient of the spread spectrum clocking generator from the first frequency adjustment coefficient to the second frequency adjustment coefficient in sequence, wherein an amplitude of each adjustment is the predetermined adjustment amount, and wherein a time length between two adjustments is the predetermined interval.

12. The terminal according to claim 11, wherein when the access bandwidth availability which the service processor accesses the DDR memory changes, the CPU is further configured to:
obtain the initial frequency;
determine, in a preconfigured frequency set, the first target frequency, wherein the first target frequency corresponds to a direction of the change of the access bandwidth; and
generate the first frequency adjustment request according to the initial frequency and the first target frequency.

13. The terminal according to claim 11, wherein the frequency adjustment module is further configured to:
obtain an input frequency of the spread spectrum clocking generator, and a preconfigured ratio relationship between a working frequency of the DDR interface and an output frequency of the spread spectrum clocking generator;
determine, according to the initial frequency and the preconfigured ratio relationship, a first output frequency of the spread spectrum clocking generator corresponding to the initial frequency;
determine, according to the first target frequency and the preconfigured ratio relationship, a second output frequency of the spread spectrum clocking generator corresponding to the first target frequency;
determine, according to the input frequency and the first output frequency of the spread spectrum clocking generator, the first frequency adjustment coefficient of the spread spectrum clocking generator corresponding to the initial frequency; and
determine, according to the input frequency and the second output frequency of the spread spectrum clocking generator, the second frequency adjustment coefficient of the spread spectrum clocking generator corresponding to the first target frequency.

14. The terminal according to claim 11, wherein before obtaining the predetermined adjustment amount by which the frequency adjustment coefficient of the spread spectrum clocking generator is adjusted each time and the predetermined interval between two adjacent adjustments, the frequency adjustment module is further configured to:
obtain the locking-in frequency adjustment range of the phase-locked loop in the spread spectrum clocking generator, the locking-in frequency adjustment range of the DLL in the DDR interface, the locking-in time range of the phase-locked loop in the spread spectrum clocking generator, and the locking-in time range of the DLL in the DDR interface; and
determine the predetermined adjustment amount and the predetermined interval, wherein the frequency adjustment value of the spread spectrum clocking generator corresponding to the predetermined adjustment amount is within the locking-in frequency adjustment range of the phase-locked loop in the spread spectrum clocking generator, wherein the working frequency adjustment value of the DDR interface corresponding to the predetermined adjustment amount is within the locking-in frequency adjustment range of the DLL in the DDR interface, and wherein the predetermined interval is within the locking-in time range of the phase-locked loop in the spread spectrum clocking generator and the locking-in time range of the DLL in the DDR interface.

15. The terminal according to claim 11, wherein when the first target frequency cannot satisfy the change of the access bandwidth availability which the service processor accesses the DDR memory, the CPU is further configured to generate a second frequency adjustment request, wherein the second frequency adjustment request comprises the first target frequency and a second target frequency, and wherein the frequency adjustment module is further configured to:

determine, according to the second frequency adjustment request, a third frequency adjustment coefficient of the spread spectrum clocking generator corresponding to the first target frequency; and gradually adjust the frequency adjustment coefficient of the spread spectrum clocking generator in sequence according to the second frequency adjustment coefficient until the third frequency adjustment coefficient is reached, wherein an amplitude of each adjustment is the predetermined adjustment amount, and a time length between two adjustments is the predetermined interval.

\* \* \* \* \*

UNITED STATES PATENT AND TRADEMARK OFFICE
CERTIFICATE OF CORRECTION

PATENT NO.         : 9,996,104 B2
APPLICATION NO.    : 15/475298
DATED              : June 12, 2018
INVENTOR(S)        : Huang Page 1 of 1

It is certified that error appears in the above-identified patent and that said Letters Patent is hereby corrected as shown below:

On the Title Page

Under (*) Notice should read:
Subject to any disclaimer, the term of this patent is extended or adjusted under 35 U.S.C. 154(b) by 0 days.

Signed and Sealed this
Thirty-first Day of July, 2018

Andrei Iancu
*Director of the United States Patent and Trademark Office*